United States Patent

[11] 3,612,887

| [72] | Inventors | Gerard P. Canevari<br>Cranford;<br>William M. Bustin, Summit, both of N.J. |
|---|---|---|
| [21] | Appl. No. | 638,849 |
| [22] | Filed | May 16, 1967 |
| [45] | Patented | Oct. 12, 1971 |
| [73] | Assignee | Esso Research and Engineering Company |

[54] RADIATION SENSITIVE OIL-IN-WATER DETECTOR
2 Claims, 4 Drawing Figs.

[52] U.S. Cl. .................................................. 250/219 Q,
73/61.1, 356/70, 250/218
[51] Int. Cl. .................................................. G01n 5/02
[50] Field of Search ......................................... 250/218,
226, 219; 88/14; 356/185, 201, 70, 209; 73/53,
61.1

[56] References Cited
UNITED STATES PATENTS
2,244,507  6/1941  Thomas ........................ 250/226 X

| 2,245,557 | 6/1941 | Franzman.................... | 88/14 |
| 3,116,982 | 1/1964 | McIlvaine.................... | 250/218 X |
| 3,229,505 | 1/1966 | Sanford et al................. | 73/61.1 |
| 3,276,004 | 9/1966 | Mayo, Jr...................... | 250/218 X |

FOREIGN PATENTS
| 1,032,694 | 6/1966 | Great Britain................. | 73/61.1 |

Primary Examiner—Walter Stolwein
Attorneys—Manahan and Wright and W. O. Heilman

ABSTRACT: The invention covers a technique and apparatus for continuously monitoring a small amount of an effluent to immediately detect contaminants so that appropriate corrective measures may be promptly taken. A small, continuous sample of an aqueous effluent flows onto a moving tape of lipophilic fabric wherein any contaminant, such as oil, is adsorbed. The tape passes over a light source wherein the degree of light reflection is a function of the amount of any oil contaminant present.

G. P. CANEVARI
W. M. BUSTIN  INVENTORS

BY W. O. T Heilman

PATENT ATTORNEY

RADIATION SENSITIVE OIL-IN-WATER DETECTOR

It is known in the art that the continuous measurement of small amounts of pollutants present in water effluents has become very important and critical so as to permit immediate correction and avoid contamination of the water into which the effluent is discharged such as streams, lakes, waterways, etc. This is particularly so with respect to effluents from manufacturing complexes such as oil refineries and also effluents from vessels such as seagoing tankers. If the aqueous effluent contains oil pollutants in excess of a predetermined maximum, usually greater than 100 parts per million, preventive steps and measures should be taken immediately to reduce the amount of pollution to an acceptable level. In accordance with the present invention a particular process and apparatus are utilized so as to continuously monitor the amount of oil pollutant in the effluent aqueous phase and thus permit immediate corrective measures.

The present invention may be fully understood by reference to the drawings illustrating embodiments of the same.

FIG. 1A shows some details of operation, while

Figure 3:
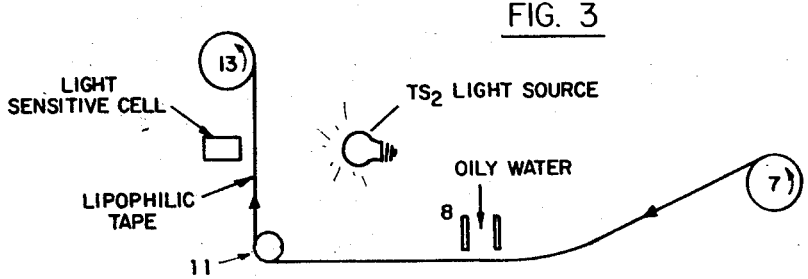

FIG. 3 describes a modification of the technique.

Figure 1:
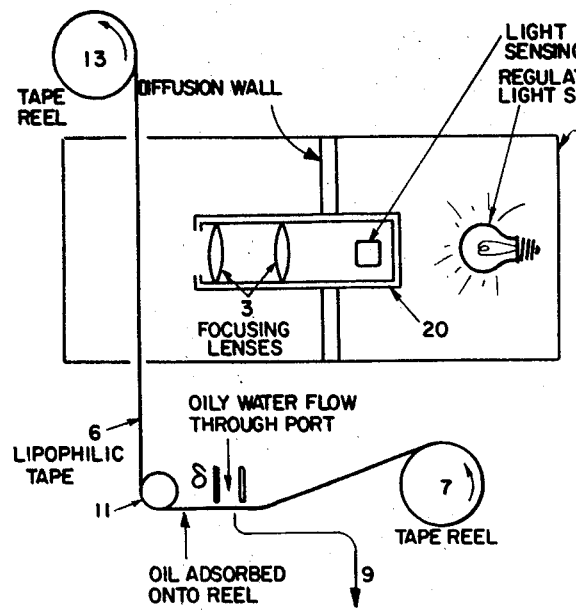
FIG. 1 shows a diagrammatical sketch of the apparatus.
Figure 1A:
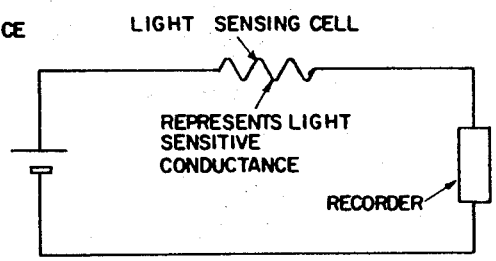

Referring specifically to FIG. 1, a housing 10 contains a supported, light source 2. This light source may be of any design such as a regulated light source, described by L. A. Rosenthal, "Review of Scientific Instruments" 36, 1329–1331, 1965. Supported within housing 10 is compartment 20 wherein are situated focusing lenses 3 which may be of a known design and are so arranged so as to focus an image of a tape 6 onto a conventional light sensing cell 4. This cell measures the amount of light reflected from the tape. The cell may also be of a known design such as manufactured by the Clairex Corporation Model CL 505. The conductance of this sensing cell increases as the light intensity increases. This cell is connected to a recorder 12 by a circuit illustrated in FIG. 1A. The recorder records the amount of current flowing through the light sensing cell. As long as the conductance of the recorder is high compared with the light sensing cell as, for example, 10 to one, the current will be proportional to the cell conductance and thus the recorder will record the amount of light falling on the cell.

A translucent plastic wall 5 diffuses the light from light source 2 and provides uniform illumination for the lipophilic tape 6. This light diffusing element 5 may be made from ¼-inch thick sheet of clear transparent acrylic resin (such as Lucite) that has been suitably roughened by sand blasting to produce the appearance of frosted glass.

In accordance with the present invention the lipophilic tape 6 is unwound from a lower tape roller 7 and is passed beneath a port 8 through which a continuous sample of the water effluent passes. The lipophilic tape 6 is of a type that the water will pass through and be removed by conduit or suitable means 9 while any oil contaminant is adsorbed on the tape. The tape passes about roller 11 through housing 10 in front of focusing lens 3 and is then wound about upper tape reel 13. The lipophilic tape 6 is of a character so as to be completely compatible with any of the oil droplets dispersed in the water. Hence, when the basically nonpolar oil droplet contacts the similarly nonpolar surface, it represents, thermodynamically, a stable condition. Thus, the oil readily "wets" and adsorbs onto the tape and displaces the water film. One type of suitable lipophilic material is polypropylene in the form of felt (very fine discontinuous fibers entangled so as to form a continuous fabriclike material). A 3-ounce polypropylene felt manufactured by the American Felt Co. is excellent. (Three ounces represent a weight of 3 ounces of felt per sq. yd. of material.)

Although this represents a highly lipophilic surface because of the nonpolar nature of polypropylene and the large surface area afforded by the many small fibers, it is not mechanically strong. Hence, it is "needled" (mechanically attached) to a supporting scrim which may also be of polypropylene, but woven in a conventional manner to produce a strong substrate. This supporting scrim may be 1 ounce polypropylene. The felt is needled onto only one side of the supporting scrim since only one face of the tape is required for the present measuring technique.

Figure 2:
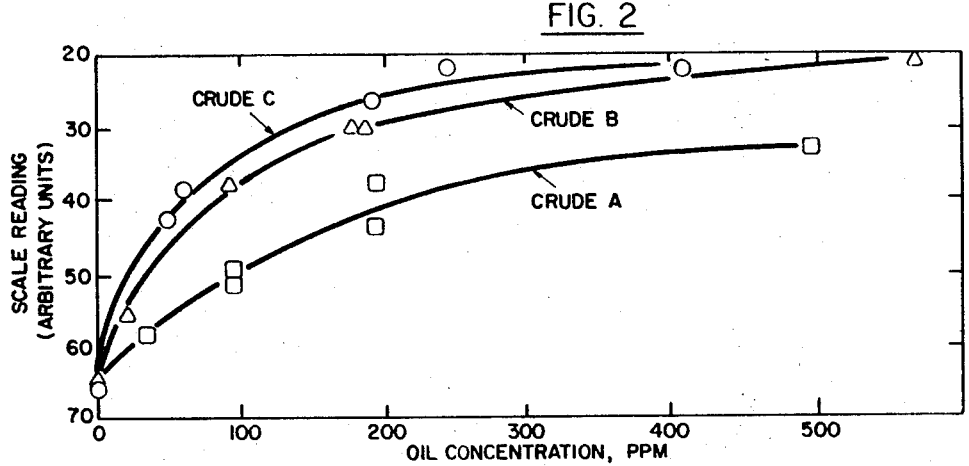
FIG. 2 illustrates the effectiveness of the technique.

Light is reflected by the tape 6 through the focusing lenses 3 onto the light sensing cell 4. Any oil adsorbed onto the tape darkens it and reduces the amount of light reflected. Thus, a decrease in conductance of the cell and a decrease in reading of the recorder occurs when oil is adsorbed onto the tape. These decreases are proportional to the amount of oil in the water. Hence the reading of the recorder is directly related to the amount of oil in the water, as illustrated by FIG. 2. Various crudes have characteristic curves as illustrated by crudes A, B and C.

Thus, the present invention is concerned with a technique of continuously passing an oil-water mixture onto a lipophilic tape which retains any oil but permits the water to pass through. The tape then passes by a light source and the intensity of the light reflected from the tape is determined. The greater the concentration of the oil on the tape the less the amount of light is reflected therefrom. The device described can also be modified to operate by transmitted, rather than reflected, light. FIG. 3 shows this modification. Light from regulated light source 2 is transmitted through tape 6 and measured by light sensing cell 4. When oil is adsorbed by the tape, the tape is darkened and less light is transmitted through the tape to the cell. This decreases the conductance and the amount of current measured by recorder 12 is less and is proportional to the concentration of the pollutant.

We claim:

1. Process for determining the concentration of oily constituents in an aqueous phase which comprises passing a minor portion of said aqueous phase onto a lipophilic tape which is characterized by allowing water to pass therethrough and which will adsorb oily constituents, thereafter directing light on said tape and measuring the amount of reflected light by means of a pickup light sensing cell, which cell will transmit an electric current in proportion to the light pickup.

2. Apparatus for determining the concentration of oily contaminants present in an aqueous phase which comprises in combination, (1) a first housing having positioned at one end thereof, (2) a regulated light source, (3) a lipophilic tape and means for passing the same through said first housing at the other end thereof, said lipophilic tape characterized by permitting water to pass therethrough, (4) means for introducing a minor portion of said aqueous phase onto said lipophilic tape before said tape passes through said first housing, (5) a second housing positioned within said first housing and having an open end and a closed end, said closed end being adjacent said regulated light source and said open end being adjacent said lipophilic tape, (6) a light sensing cell within said second housing adjacent said closed end, (7) focusing lenses within said second housing adjacent said open end, (8) a light diffusion element positioned between said lipophilic tape and said regulated light source and, (9) and electrical recorder for measuring the amount of light reflections pickup from said light sensing cell.